United States Patent [19]

Takoh et al.

[11] Patent Number: 5,277,945
[45] Date of Patent: Jan. 11, 1994

[54] RESIN COMPOSITION FOR COATING

[75] Inventors: Noboru Takoh; Shingo Matsukawa; Masafumi Kawamura, all of Hiratsuka, Japan

[73] Assignee: Kansai Paint Co., Ltd., Hyogo, Japan

[21] Appl. No.: 723,274

[22] Filed: Jun. 28, 1991

[30] Foreign Application Priority Data

Jun. 28, 1990 [JP] Japan .................................. 2-168315

[51] Int. Cl.$^5$ ..................... C08F 20/68; C08F 283/02; C08L 75/06
[52] U.S. Cl. ................................. 428/423.1; 525/127; 525/131; 525/404; 525/440; 525/445; 525/455
[58] Field of Search ................ 525/127, 131, 455, 66, 525/440, 404, 445; 428/423.1

[56] References Cited

PUBLICATIONS

Encyclopedia of Polymer Science and Engineering, vol. 13, 1988, John Wiley pp. 288–294.
Chem. Abstracts vol. 110, 1989, 213482 Kazama.
Kazama, et al. Polymer, 31, 990 2207.
Saunders, K. J. Organic Polymer Chem. London, Chapman and Hall.
Frich in ACS Symposium Series 285 Appl. Pol. Science. ACS, Wash. D.C. 1985.

Primary Examiner—James J. Seidleck
Assistant Examiner—I. Zemel
Attorney, Agent, or Firm—Wenderoth, Lind & Ponack

[57] ABSTRACT

A resin composition for coating, comprising as main components:
 (A) a graft polymer obtained by reacting
  (a) at least one polymer polyol selected from polyester polyols, polyether polyols and polyether polyester polyolshaving a number-average molecular weight of 500–6,000,
  (b) a polymer having two hydroxyl one end, and
  (c) a polyisocyanate compound, and
 (B) a crosslinking agent selected from polyisocyanate compounds and amino resins.

This composition gives a coating film excellent in flexibility, hardness, stain resistance, etc.

23 Claims, No Drawings

RESIN COMPOSITION FOR COATING

BACKGROUND OF THE INVENTION

1. Field of the Invention

The present invention relates to a resin composition for coating which can form a coating film excellent in flexibility, hardness, stain resistance, etc.

2. Description of the Related Art

Alkyd resin type or polyester resin type coatings have excellent flexibility and are in wide use as coatings for steel plate materials, automobiles, industrial machinery, construction materials, cans for food and drink, etc. In recent years, however, the quality requirements for coatings have increased and it has become highly necessary to develop a coating capable of forming a coating film having excellent stain resistance, high hardness and good flexibility.

In coating films, however, (a) flexibility and (b) hardness and stain resistance are opposing properties, in general. As a coating resin satisfying all of these properties, there is proposed a polyester resin using terephthalic acid [Japanese Patent Application Kokai (Laid-Open) Nos. 57746/1982 and 117568/1982]; however, the resin is not fully satisfactory.

Acrylic resin type or vinyl resin type coatings are also known, but they are insufficient in film flexibility although they have a high film hardness.

Further, Japanese Patent Application Kokai (Laid-Open) No. 294778/1989 discloses, as a polyester resin coating, a coating comprising, as a main component, a polyester type graft polymer obtained by polycondensing polyester-forming components consisting mainly of a dibasic acid compound, a diol compound and a condensation type macromonomer. In the polyester type graft polymer, however, when the macromonomer contains a (meth)acrylic acid ester, the alkyl group of the (meth)acrylic acid ester may cause dissociation during the polycondensation for production of the graft polymer, which may induce an esterification reaction starting from the dissociation site and may make it difficult to produce a desired graft polymer. Consequently, the resulting coating tends to give a coating film practically insufficient in hardness, chemical resistance, weather resistance, adhesion, etc.

Furthermore, it is known to synthesize a polyurethane graft polymer from a macromonomer having a dihydroxyl group at one end and a dissocyanate compound [POLYMER BULLETIN 8, 239-244 (1982)]. The polyurethane graft polymer, however, contains a large amount of urethane bond in the molecule, and consequently has a high structural viscosity and is poor in coatability, smoothness of coating film, etc.

In view of the above situation, the present inventors made study in order to develop a novel coating capable of forming a coating film excellent in flexibility, stain resistance and hardness. As a result, the present inventors found that a coating comprising, as main components, (A) a graft copolymer consisting of a particular backbone component and a particular branch component, wherein the two components are linked by urethane bond and (B) a polyisocyanate or an amino resin, can form a coating film satisfying all of the above-mentioned opposing properties [(a) flexibility and (b) hardness and stain resistance]. The present invention has been completed based on the finding.

SUMMARY OF THE INVENTION

According to the present invention, there is provided a resin composition for coating, comprising as main components:

(A) a graft polymer obtained by reacting
 (a) at least one polymer polyol selected from polyester polyols, polyether polyols and polyether polyester polyols having a number-average molecular weight of 500–6,000,
 (b) a polymer having two hydroxyl groups at one end, and
 (c) a polyisocyanate compound, and (B) a crosslinking agent selected from polyisocyanate compounds and amino resins.

DETAILED DESCRIPTION OF THE INVENTION

In the present invention, the graft copolymer (A) is obtained by reacting the three components (a), (b) and (c). In the graft copolymer (A), it is presumed that the polymer polyol [the component (a)] forms a backbone structure, that the hydroxyl group-containing polymer the component (b)] forms a branch structure, and that the polyisocyanate compound [the component (c)] serves to bond the components (a) and (b).

The components (a), (b) and (c) are hereinafter described more specifically.

Component (a): at least one polymer polyol selected from polyester polyols, polyether polyols and polyether polyester polyols having a number-average molecular weight of 500–6,000.

The polymer polyols have a hydroxyl group at least at each end. Of the polymer polyols, the polyether polyols further have at least one ether linkage (—O—) in the molecular chain. The polymer polyols preferably have a substantially linear structure, but may have a branched structure.

The polyester polyols can be obtained by subjecting to an esterification reaction a dibasic acid compound having two carboxyl groups in the molecule (including an alkyl esterified compound thereof or an anhydride thereof) and a diol compound having two hydroxyl groups in the molecule so that the resulting ester product has a hydroxyl group at each end of the molecule, according to a per se known method (e.g. a direct esterification method, an ester interchange method). In the esterification reaction, there can be used, in combination with the dibasic acid compound and the diol compound, a polyhydric (at least trihydric) alcohol and a polybasic (at least tribasic) acid compound.

As the dibasic acid compound, there can be mentioned, for example, aromatic, aliphatic or alicyclic dibasic acids such as isophthalic acid, terephtahlic acid, orthophtalic acid, 2,6-naphthalenedicarboxylic acid, 4,4'-diphenylmethanedicarboxylic acid, tetrahydrophthalic acid, methyltetrahydrophthalic acid, hexahydrophthalic acid, methylhexahydrophthalic acid, endomethylenehexahydrophthalic acid, methylendomethylenetetrahydrophthalic acid, maleic acid, fumaric acid, itaconic acid, succinic acid, glutaric acid, adipic acid, azelaic acid, pimelic acid, suberic acid, sebacic acid, dimer fatty acids (dimer acids) and the like; alkyl esterified compounds of said dibasic acids, such as methyl esters, ethyl esters, butyl esters and the like; and anhydrides of said dibasic acids.

As the diol compound, there can be mentioned, for example, ethylene glycol, propylene glycol, neopentyl glycol, 1,2-butylene glycol, 1,3-butylene glycol, 2,3-butylene glycol, 1,4-butylene glycol, 1,5-pentanediol, 3-butyl-1,5-pentanediol, 1,6-hexanediol, 2,5-hexanediol, cyclohexanediol, Esterdiol 204 (a product of Union Carbide), tricyclodecanedimethanol, 1,4-cyclohexanedimethanol, hydrogenated bisphenol and bisphenol A.

These dibasic acid compounds and diol compounds can be used singly or in combination of two or more.

As the polybasic acid compound, there can be mentioned, for example, trimellitic acid and pyromellitic acid. As the polyhydric alcohol, there can be mentioned glycerine, trimethylolpropane, trimethylolethane, 1,2,6-hexanetriol, pentaerythritol, etc.

As the polyester polyols, there may also be used, for example, ring-opening polymers of lactones such as ε-caprolactone, valerolactone and the like, and addition products between said diol and said lactone.

It is desired that these polyester polyols basically contain no ether linkage in the molecular chain.

Then, the polyether polyols are polymers which have at least one ether linkage in the molecular chain and a hydroxyl group at each end of the molecular chain and which are substantially linear. They may be branched polymers. Specific examples of the polyether polyols include polyether diols such as polyethylene glycol, polypropylene glycol, polytetramethylene glycol and the like, and etherified compounds obtained by reacting the above-mentioned diol compound with an alkylene oxide such as ethylene oxide, propylene oxide or the like.

The polyether polyester polyols have at least one ether linkage and at least one ester linkage in the molecular chain and a hydroxyl group at each end of the molecule. These polyols include, for example, compounds obtained by an estrification reaction between (a) an alkyl etherified diol (e.g. diethylene glycol, dipropylene glycol) or the above-mentioned polyether diol and (b) the above-mentioned dibasic acid compound.

The component (a) preferably has a number-average molecular weight of generally 500–6,000, preferably 800–4,000, more preferably 900–3,000, in view of the balance of film hardness, flexibility, stain resistance, etc. required for the graft copolymer of the present invention.

In the present invention, preferable as the polymer polyol (a) are polyester polyols. Particularly preferably are those polyester polyols which can be obtained using, as an essential acid component, an aromatic dibasic acid such as isophthalic acid, terephthalic acid, orthophthalic acid or the like and further, as necessary, an alicyclic dibasic acid such as hexahydrophthalic acid, tetrahydrophthalic acid, endomethylenetetrahydrophthalic acid or the like and which contain cyclic dibasic acid(s) in an amount of 100–30 mole % based on the total acid components.

Component (b): a polymer having two hydroxyl groups at one end.

The hydroxyl group-containing polymer as the component (b) includes polymers using a vinyl polymer as a basic skelton and having two hydroxyl groups (for example, in the form of

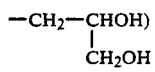

at one end. Desirably, the other end of the polymer basically has no functional group reactive to isocyanate, such as hydroxyl group, carboxyl group, amino group, epoxy group or the like, in order to form a graft copolymer.

Such a component (b) can be obtained by polymerizing a polymerizable monomer in the presence of thioglycerine (chain transfer agent) according to an ordinary process. As the polymerizable monomer, there can be mentioned, for example, vinyl esters of organic acids, such as vinyl acetate, vinyl propionate, vinyl butyrate and the like; vinyl aromatic compounds such as styrene, substituted styrenes (e.g. α-methylstyrene), vinylpyridine, vinylnapthalene and the like; (meth)acrylic acid esters such as methyl (meth)acrylate, ethyl (meth)acrylate, butyl (meth)acrylate and the like; N-vinyl compound such as (metha)acrylonitrile, acrolein, N-vinylpyrrolidone, N-vinylcaprolactam and the like; unsaturated acid anhydrides such as maleic anhydride and the like; and N-substituted maleimides such as N-phenylmaleimide and the like. Of these, preferably are styrene, methyl methacrylate, acrylonitrile, etc.

As the component (b), a per se known product can be used. For example, there can be used, as products on the market, Macromonomer-HS-6 (main component: polystyrene), Macromonomer-NH-6 (main component: styrene-acrlonitrile copolymer) and Macromonomer-HA-6 (main component: methyl methacrylate polymer) [all of these are trade names of TOAGOSEI CHEMICAL INDUSTRY CO., LTD.].

The molecular weight of the component (b) is not strictly restricted, but preferably is generally 1,000–10,000, particularly 1,500–8,000 in terms of number-average molecular weight.

component (c): a compound having at least two, preferably two isocyanate groups in the molecule (a polyisocyanate compound).

The polyisocyanate compound as the component (c) can be any of aliphatic type, alicyclic type and aromatic type. Specific examples of the polyisocyanate compound include alicyclic diisocyanate compounds such as isophorone diisocyanate, methylcyclohexane-2,4-diisocyanate, methylcyclohexane-2,6-diisocyanate, 4,4'-methylenebis(cyclohexylioscyanate), 1,3-di(isocyanatomethyl)cyclohexane and the like; aliphatic diisocyanate compounds such as tetramethylene diisocyanate, hexamethylene diisocyanate, trimethylehexane diisocyanate and the like; and aromatic diisocyanate compounds such as tolylene diisocyanate, xylylen diisocyanate, 4,4'-diphenylmethane diisocyanate and the like. These compounds can be used singly or in combination of two or more.

Of these polyisocyanate compounds, preferable are hexamethylene diisocyanate and isophorone diisocyanate.

Component (A)

The graft copolymer as the component (A) can be obtained by reacting the above components (a), (b) and (c) with each other. This reaction can be effected specifically, for example, by subjecting the components (a), (b) and (c) to an addition reaction simultaneously in the presence of an organic solvent at 40°–150° C., desirably 80°–100° C. In this reaction, a per se known catalyst (e.g. organotin compound) can be used.

The graft copolymer (A) can also be obtained by additing the component (c) to the hydroxyl groups of the component (b) to prepare an isocyanate-terminated polymer and then adding the component (a) thereto.

In the above reaction, as the organic solvent, there can be used various organic solvents having no functional group reactive to isocyanate group. Such as organic solvent can be appropriately selected, depending upon the solubility, application purpose, coating method, etc. of the graft copolymer obtained. A mixture of two or more organic solvents may be used. Specific examples of the organic solvent include hydrocarbon solvents such as hexane, heptane, toluene, xylene, cyclohexane and the like; ether solvents such as diethyl ether, dibutyl ether, dioxane, ethylene glycol diethyl ether, diethylene glycol diethyl ether and the like; ester solvents such as ethyl acetate, butyl acetate and the like; and ketone solvents such as methyl ethyl ketone, methyl isobutyl ketone, cyclohexanone, isophorone and the like.

The proportions of the components (a), (b) and (c) in production of the graft copolymer (A) are not particularly restricted and can be varied in a wide range depending upon the properties, etc. required for the graft copolymer obtained. However, the desirable weight ratio of the component (a)/the component (b) is generally 99/1–20/80, preferably 97/3–60/40, more preferably 95/5–70/30. Desirably, the component (c) is used in such a proportion that the total hydroxyl groups in the components (a) and (b) become generally 1.001–10.0 moles, preferably 1.01–5.0 moles per 1 mole of the isocyanate groups in the component (c).

In the graft copolymer (A) obtained by reacting the components (a), (b) and (c), the component (a) constitutes a backbone polymer; the component (b) constitutes a branch polymer; and the component (c) is presumed to serve to bond component (a) molecules with each other, or component (b) molecules with each other, or component (a) molecules and component (b) molecules. The reaction between the component (c) and the component (a) or (b) is an urethane-forming reaction between isocyanate group and hydroxyl group.

The graft copolymer (A) is presumed to have such a structure that the component (b) is bonded to the backbone polymer consisting mainly of the component (a) [the backbone polymer further contains the component (c) in some cases], as a side chain in the shape of pendant, via the component (c).

The graft copolymer (A) can have a hydroxyl group at least at each end of the backbone polymer consisting mainly of the component (a). Further, the graft copolymer (A) suitably has a number-average molecular weight converted into polystyren of generally 2,000–40,000, particularly 2,000–30,000, more particularly 3,000–20,000 as measured by gel permeation chromatography, and a hydroxyl group of 1–250, particularly 1–100, more particularly 2–90.

Component (B)

The above-mentioned graft copolymer (A) is used in combination with a polyisocyanate compound and/or an amino resin [component (B)]. This component (B) serves as a crosslinking agent which crosslinks and cures the component (A) three-dimensionally.

The polyisocyanate compound includes aliphatic, alicyclic or aromatic compounds having at least two isocyanate groups in the molecule. As specific examples of these compounds, there can be mentioned, for example, organic diisocyanates such as aliphatic diisocyanates (e.g. hexamethylene diisocyanate, trimethylhexamethylene diisocyanate), alicyclic diisocyanates (e.g. hydrogenated xylylene diisocyanate, isophorone diisocyanate) and aromatic diisocyanates (e.g. tolylene diisocyanate, 4,4'-diphenylmethane diisocyanate); addition products between the above organic diisocyanate and a polyhydric alcohol, a low-molecular polyester resin, water or the like; polymers of the above organic diisocyanates; and isocyanate biurets. As representative products on the market, of these compounds, there are, for example, UBRNOCK D-750, D-800, DN-950, DN-970 and 15-455 [these are products of DAINIPPON INK & CHEMICALS, INC.], DESUMODUR L, NHL, IL and N3390 [these are products of Bayer, Germany], TAKENATE D-102, D-202, D-110N and 123N these are products of Takeda Chemical Industries, Ltd.], CORONATE L, HL, EH and 203 [these are products of Nippon Polyurethane Industry Co., Ltd.], and DULANATE 24A-90CX this is a product of ASAHI CHEMICAL INDUSTRY CO., LTD.]. Of the above-mentioned polyisocyanate compounds, diisocyanate compounds are preferable.

It is also possible to use, as the polyisocyanate compound, a blocked polyisocyanate compound obtained by blocking the isocyanate group of the above-defined polyisocyanate compound with a blocking agent. As the blocking agent, there can be used ordinary blocking agents of phenol type, lactam type, alcohol type, oxime type, etc.

As the amino resin, there can be mentioned, for example $C_1$-$C_5$ alkyl etherified melamine resins, urea resins and benzoquanamine resins.

The compounding ratio of the component (A)/the component (B) is not strictly restricted, but can be generally 50/50–95/5, preferably 70/30–93/7, more preferably 70/30–90/10 in terms of solid weight ratio.

The present resin composition for coating, comprising the component (A) and the component (B) as main components can further comprises, as necessary, pigments and ordinary additives used in coatings. The curing of the film formed by the present resin composition can be effected under appropriate conditions by utilizing the action of the crosslinking agent used in the resin composition. For example, when an unblocked polyisocyanate compound is used as the crosslinking agent, the film can be cured generally at a temperature of room temperature to about 120° C.; when a blocked polyisocyanate compound or an amino resin is sued as the crosslinking agent, a three-dimensionally crosslinked and cured film can be obtained by baking the film formed by the present resin composition, at a temperature of about 60° C. to about 350° C. for 5 seconds to about 40 minutes.

To coat the present resin composition to form a film, there can be used, for example, brush coating, roll coater, spray coating and electrostatic coating.

In the graft copolymer [the component (A)] of the present resin composition, the component (a) as a backbone polymer is soft and excellent in flexibility, and the component (b) as a branch polymer is hard and good in stain resistance, etc. Therefore, the coating film (substantially three-dimensionally crosslinked film) formed with the present resin composition possesses all of the above-mentioned properties. Moreover, in the coating film, urethane bond is formed owing to the use of the component (c); accordingly, the coating film formed with the present resin composition has further improved physical properties.

In the graft copolymer [the component (A)], the type and molecular weight of the backbone polymer can be designed freely, and the type of the branch polymer [the component (b)] has no restriction because the reaction between the hydroxyl group and isocyanate group for synthesis of the graft copolymer can be conducted at low temperatures as compared with esterification reaction. Further, the polyisocyanate compound can be selected without any restriction and an appropriate polyisocyanate compound can be used depending upon the application purpose and required properties of the coating film formed with the present resin composition. Furthermore, the molecular weight of the graft copolymer (A) can be designed freely by appropriately changing the ratio of the hydroxyl group and the isocyanate group in the graft copolymer (A). Also, the ratio of the backbone polymer [the component (a)] and the branch polymer [the component (b)] can be selected freely depending upon the type of the backbone polymer. Thus, in designing the graft copolymer, there exist large degrees of freedom. Accordingly, the resin composition of the present invention can form a coating film having various excellent properties, and the coating film formed therewith has an excellent balance in hardness and flexibility.

The present invention is hereinafter described more specifically with reference to Examples.

In the Examples, "parts" and "%" refer to "parts by weight" and "% by weight", respectively, unless otherwise specified.

EXAMPLE 1

The following materials were fed into a flask equipped with a thermometer, a stirrer and a water separator.

| | |
|---|---|
| Terephathalic acid | 149.7 parts |
| Isophthalic acid | 299.4 parts |
| Adipic acid | 263.3 parts |
| Neopentyl glycol | 322.8 parts |
| Ethylene glycol | 127.1 parts |
| Monobutyltin hydroxide | 0.1 part |

The flask contents were heated to 240° C. in 4 hours with stirring, and maintained at that temperature for 2 hours. 4 %, based on the total amount fed, of xylene was added in order to accelerate the removal of the water generated in the esterification reaction, and heating was continued so as to keep 240° C., until an acid value of 1 or less was obtained. The heating was stopped when an acid value of 1 or less was obtained. 895.9 parts of N-methyl-2-pyrrolidone was added for dilution [synthesis of component (a)]. (The resulting product has a number-average molecular weight of 1,600 and a hydroxyl group at each end.) When the temperature of the reaction mixture became 50° C. or less, the following materials were added.

| | |
|---|---|
| HA-6 (a product of TOAGOSEI CHEMICAL INDUSTRY CO., LTD.) [component (b)] | 249.6 parts |
| Hexamethylene diisocyanate [component (C)] | 96.9 parts |
| Dibutyltin dilaurate | Few drops |

The resulting mixture was heated to 90° C. and maintained at that temperature for 4 hours. The reaction mixture was subjected to IR analysis. The analysis confirmed that there was no absorption of NCO at 2,250-2,270 cm$^{-1}$.

The reaction mixture was diluted by:

| | |
|---|---|
| N-methyl-2-pyrrolidone | 112.0 parts |
| cyclohexanone | 1,007.9 parts | to obtain a graft copolymer varnish (A-1) having a solid content of 40 %. The polymer had a number-average molecular weight of 10,000 and a hydroxyl value of 5.

100 parts of the graft copolymer varnish (A-1) was mixed with 7.5 parts of Cymel 303 (a methyl etherified melamine resin of low condensation degree manufactured by Mitsui-Cyanamid, Ltd.) and 0.47 part of p-toluenesulfonic acid. Thereto was further added ethylene glycol monoethyl ether acetate to adjust the viscosity of the resulting mixture to 100 seconds as measured by Ford Cup No. 4 at 25° C.

EXAMPLE 2

The following materials were fed into a flask equipped with a thermometer, a stirrer and a water separator.

| | |
|---|---|
| Terephathalic acid | 305.3 parts |
| Isophthalic acid | 203.5 parts |
| Adipic acid | 191.8 parts |
| Neopentyl glycol | 287.4 parts |
| Ethylene glycol | 169.7 parts |
| Monobutyltin hydroxide | 0.1 part |

The flask contents were heated to 240° C. in 4 hours with stirring, and maintained at that temperature for 2 hours. 4%, based on the total amount fed, of xylene was added in order to accelerate the removal of the water generated in the esterification reaction, and heating was continued so as to keep 240° C., until an acid value of 1 or less was obtained. The heating was stopped when an acid value of 1 or less was obtained. 538.5 parts of N-methyl-2-pyrrolidone was added for dilution [synthesis of polyester polyol varnish, component (a)]. (The resulting product has a number-average molecular weight of 920 and a hydroxyl group at each end.)

The following materials were mixed.

| | |
|---|---|
| HA-6 (a product of TOAGOSEI CHEMICAL INDUSTRY CO., LTD.) [component (b)] | 176.5 parts |
| Isophorone diisocyanate [component (c)] | 164.3 parts |
| N-methyl-2-pyrrolidone | 467.1 parts |

The resulting mixture was heated to 90° C., and a reaction was continued until an isocyanate value of 177 was obtained, whereby the component (c) was added to the hydroxyl groups of the component (b).

Then, the previously obtained polyester polyol varnish and few drops of dibutyltin dilaurate were added, and the resulting mixture was heated to 90° C. The resulting reaction mixture was subjected to IR analysis. The analysis confirmed that there was no absorption of isocyanate group at 2,250-2,270 cm$^{-1}$. Thereafter, the reaction mixture was diluted with 1,005.6 parts of cyclohexane to obtain a graft polymer varnish (A-2) having a solid content of 40%. The graft copolymer had a number-average molecular weight of 5,000 and a hydroxyl value of 31.

100 Parts of the graft copolymer varnish (A-2) was mixed with 16.6 parts of 75% BL3175 (a blocked isocyanate manufactured by Sumitomo-Bayer K.K.) and a small amount of a catalyst (1,3-diacetoxytetrabutyl distannoxane). Further, ethylene glycol ethyl ether acetate was added to adjust the viscosity of the resulting mixture to 100 seconds as measured by Ford cup No. 4 at 25° C.

COMPARATIVE EXAMPLE 1

The following materials were fed into a flask equipped with a thermometer, a stirrer and a water separator.

| Terephathalic acid | 149.7 parts |
| Isophthalic acid | 299.4 parts |
| Adipic acid | 263.3 parts |
| Neopentyl glycol | 322.8 parts |
| Ethylene glycol | 127.1 parts |
| Monobutyltin hydroxide | 0.1 part |

The flask contents were heated to 240° C. in 4 hours with stirring, and maintained at that temperature for 2 hours. 4%, based on the total amount fed, of xylene was added in order to accelerate the removal of the water generated in the esterification reaction, and heating was continued so as to keep 240° C., until an acid value of 1 or less was obtained. The heating was stopped when an acid value of 1 or less was obtained. 729.3 parts of N-methyl-2-pyrrolidone was added for dilution. The mixture was cooled to below 50° C.

Then, the following materials:

| hexamethylene diisocyanate | 94.0 parts |
| dibutyltin dilaurate | few drops | were added, and the resulting mixture was heated to 90° C. and maintained at that temperature for 4 hours. The reaction mixture was subjected to IR analysis. The analysis confirmed that there was no absorption of isocyanate group at 2,250–2,270 cm$^{-1}$. The reaction mixture was diluted with the following materials:

| N-methyl-2-pyrrolidone | 91.2 parts |
| cyclohexanone | 820.5 parts | to obtain a urethane-modified polyester varnish (A-3).

100 Parts of the urethane-modified polyester varnish (A-3) was mixed with 7.5 parts of Cymel 303 [a methyl etherified melamine resin of low condensation degree manufactured by Mitsui-Cyanamid, Ltd.) and 0.47 parts of p-toluenesulfonic acid. Further, ethylene glycol monoethyl ether acetate was added to adjust the viscosity of the resulting mixture to 100 seconds as measured by Ford Cup No. 4 at 25° C.

EXAMPLE 3

The following materials were fed into a flask equipped with a thermometer, a stirrer and a water separator.

| Terephathalic acid | 214.1 parts |
| Isophthalic acid | 257.0 parts |
| Adipic acid | 226.0 parts |
| Neopentyl glycol | 325.1 parts |
| Ethylene glycol | 112.0 parts |
| Glycerine | 23.7 parts |
| Monobutyltin hydroxide | 0.1 part |

The flask contents were heated to 240° C. in 4 hours with stirring, and maintained at that temperature for 2 hours. 4%, based on the total amount fed, of xylene was added in order to accelerate the removal of the water generated in the esterification reaction, and heating was continued so as to keep 240° C., until an acid value of 1 or less was obtained. The heating was stopped when an acid value of or less was obtained. 895.9 parts of N-methyl-2-pyrrolidone was added for dilution [synthesis of component (a)]. (The resulting product has a number-average molecular weight of 1,300 and a hydroxyl group at each end.) When the temperature of the reaction mixture became 50° C. or less, the following materials were added.

| HA-6 (a product of TOAGOSEI CHEMICAL INDUSTRY CO., LTD.) [component (b)] | 111.1 parts |
| Hexamethylene diisocyanate [component (c)] | 59.1 parts |

The resulting mixture was heated to 90° C. and maintained at the temperature for 4 hours. The reaction mixture was subjected to IR analysis. The analysis confirmed that there was no absorption of NCO at 2,250–2,270 cm$^{-1}$.

The reaction mixture was diluted by:

| N-methyl-2-pyrrolidone | 112.0 parts |
| cyclohexanone | 1,007.9 parts | to obtain a graft copolymer varnish (A-3) having a solid content of 40%. The polymer has a number-average molecular weight of 4,700 and a hydroxyl value of 50.

100 Parts of the graft copolymer varnish (A-3) was mixed with 15 parts of Cymel 303 (a methyl etherified melamine resin of low condensation degree manufactured by Mitsui-Cyanamid, Ltd.) and 0.47 parts of p-toluenesulfonic acid. Thereto was further added ethylene glycol monoethyl ether acetate to adjust the viscosity of the resulting mixture to 100 seconds as measured by Ford Cup No. 4 at 25° C.

COMPARATIVE EXAMPLE 2

The following materials were fed into a flask equipped with a thermometer, a stirrer and a water separator.

| 1,4-Butanediol | 800 parts |
| HA-6 (a product of TOAGOSEI CHEMICAL INDUSTRY CO., LTD.) [component (b)] | 200 parts |
| Hexamethylene diisocyanate [component (c)] | 346.9 parts |
| N-methyl-2-pyrrolidone | 1,346.9 parts |
| Dibutyltin dilaurate | Few drops |

The mixture was heated to 90° C. to give rise to a reaction. The reaction mixture was subjected to IR analysis. The analysis confirmed that there was no absorption of isocyanate group at 2,250–2,270 cm$^{-1}$. Thereafter the reaction of mixture was diluted with 673.4 parts of N-methyl-2-pyrrolidone to obtain a graft copolymer varnish having a solid content of 40%. The varnish had a hydroxyl value of 200.

After 1 day, the varnish solidified owing to the structural viscosity. Therefore, viscosity adjustment was tried, but no fluidity was obtained and the varnish could not be used for testing.

Test for Properties of Coating Film

Each of the coating compositions prepared in Examples 1-3 and comparative Example 1 was coated on a tin plate sheet of 0.3 mm in thickness by a bar coater so that the resulting film had a thickness (as dried) of about 20μ. Each of the films was baked at 250° C. for 60 seconds (the highest temperature of the tin plate sheet was 210° C.). Each of the resulting coated sheets was tested for flexibility, pencil hardness and stain resistance. The test results are shown in Table 1.

TABLE 1

|  | Flexibility | Pencil hardness | Stain resistance |
|---|---|---|---|
| Example 1 | 2T | H | ◯ |
| Example 2 | 1T | H | ◯ |
| Example 3 | 2T | H | ◯ |
| Comparative Example 1 | 4T | HB | X |
| Comparative Example 2 | — | — | — |

The tests for flexibility, pencil hardness and stain resistance were conducted in accordance with the following methods.

Flexibility

A coated tin plate sheet was bent by 180° C. Inside the bent portion were inserted a plurality of tinplate sheets each of 0.3 mm in thickness [the number of tinplate sheets ranged from 0 to 6, i.e., seven cases of 0, 1, 2, 3, 4, 5 and 6]. Then, the coated sheet was tightened with a vise, after which the bent portion was observed. The flexibility of the coated sheet tested was expressed as the minimum number of tinplate sheets when the bent portion caused no crack.

Pencil Hardness

The pencil hardness of a coated sheet was expressed as a pencil scratch value when the sheet was subjected to JIS K 5400 6.14 Pencil Scratch Test.

Stain Resistance 0.5 part of carbon black was dispersed in 99.5 parts of distilled water to obtain a dispersion. A coated sheet was spotted with the dispersion and dried at 60° C. for 24 hours. Thereafter, the sheet was water-washed. The colors of the coated sheet before and test were compared.

◉: The sheet after test showed no change.
◯: The sheet after test blackened slightly.
Δ: The sheet after test blackened.
X: The sheet after test blackened significantly.

What we claim is:

1. A resin composition for coating, comprising as main components:
   (A) a graft copolymer obtained by reacting
      (a) at least one polymer polyol selected from the group consisting of polyester polyols, polyether polyols and polyether polyester polyols having a number-average molecular weight of 500-6,000 and having a hydroxyl group at least at each end,
      (b) a polymer having two hydroxyl groups at one end, and
      (c) a polyisocyanate compound, and
   (B) a crosslinking agent selected from polyisocyanate compounds and amino resins.

2. The composition according to claim 1, wherein the polymer polyol (a) has a substantially linear structure.

3. The composition according to claim 1, wherein the polymer polyol (a) has a number-average molecular weight in a range of 800-4,000.

4. The composition according to claim 3, wherein the polymer polyol (a) has a number-average molecular weight in a range of 900-3,000.

5. The composition according to claim 1, wherein the polymer polyol (a) is a polyester polyol which is obtained by using, as an acid component, an aromatic dibasic acid selected from the group consisting of isophthalic acid, terephthalic acid and orthophthalic acid and as an optional acidic component, an alicyclic dibasic acid selected from the group consisting of hexahydrophthalic acid, tetrahydrophthalic acid and endomethylenetetrahydrophthalic acid, and which contains aromatic and alicyclic dibasic acid(s) in an amount of 100-30 mole % based on the total acid components.

6. The composition according to claim 5, wherein the polymer polyol is a polyester polyol containing, as an acid component, a cyclic dibasic acid comprising an aromatic dibasic acid, in an amount of 100-30 mole % based on the total acid components.

7. The composition according to claim 1, wherein the hydroxyl group-containing polymer (b) is obtained by polymerizing a polymerizable monomer in the presence of thioglycerine (chain transfer agent).

8. The composition according to claim 1, wherein the hydroxyl group-containing polymer (b) has a number-average molecular weight in a range of 1,000-10,000.

9. The composition according to claim 8, wherein the hydroxyl group-containing polymer (b) has a number-average molecular weight in a range of 1,500-8,000.

10. The composition according to claim 1, wherein the polyisocyanate compound (c) is selected from hexamethylene diisocyanate and isophorone diisocyanate.

11. The composition according to claim 1, wherein in the reaction for obtaining the graft copolymer (A), the weight ratio of the polymer polyol (a)/the hydroxyl group-containing polymer (b) is in a range of 99/1-20/80.

12. The composition according to claim 11, wherein the weight ratio of the polymer polyol (a)/the hydroxyl group-containing polymer (b) is in a range of 97/3-60/40.

13. The composition according to claim 1, wherein in the reaction for obtaining the graft copolymer (A), the polyisocyanate compound (c) is used in such a proportion that the total hydroxyl groups in the polymer polyol (a) and the hydroxyl group-containing polymer (b) becomes 1.001-10.0 moles per 1 mole of the isocyanate group in the polyisocyanate compound.

14. The composition according to claim 13, wherein the polyisocyanate compound (c) is used in such a proportion that the total hydroxyl groups in the polymer polyol (a) and the hydroxyl group-containing polymer (b) becomes 1 01-5.0 moles per 1 mole of the isocyanate group in the polyisocyanate compound.

15. The composition according to claim 1, wherein the graft copolymer (A) has a hydroxyl group at each end of the backbone polymer.

16. The composition according to claim 1, wherein the graft copolymer (A) has a styrene-reduced number-average molecular weight in a range of 2,000-40,000 as measured by gel permeation chromatography.

17. The composition according to claim 16, wherein the graft copolymer (A) has a styrene-reduced number-average molecular weight in a range of 2,000-3,000 as measured by gel permeation chromatography.

18. The composition according to claim 1, wherein the graft copolymer (A) has a hydroxyl value in a range of 1-250.

19. The composition according to claim 18, wherein the graft copolymer (A) has a hydroxyl value in a range of 1-100.

20. The composition according to claim 1, wherein the solid content weight ratio of the graft copolymer (A)/the crosslinking agent (B) is in a range of 50/50-95/5.

21. The composition according to claim 20, wherein the solid content weight ratio of the graft polymer (A)/the crosslinking agent (B) is in a range of 70/30-93/7.

22. A coating comprising the composition of claim 1.

23. An article coated with the coating of claim 22.

* * * * *